F. PALMER.
HARNESS HOOK.

No. 39,351.  Patented July 28, 1863.

Witnesses.
R. T. Campbell
E. Schafer

Inventor
F. Palmer
by his Atty,
Mason, Fenwick & Lawrence

UNITED STATES PATENT OFFICE.

F. PALMER, OF JANESVILLE, WISCONSIN.

IMPROVED SNAP-HOOK.

Specification forming part of Letters Patent No. 39,351, dated July 28, 1863.

*To all whom it may concern:*

Be it known that I, F. PALMER, of Janesville, in the county of Rock and State of Wisconsin, have invented a new and Improved Harness Snap-Hook; and I do hereby declare that the following is a full, clear, and exact description thereof, reference being had to the accompanying drawings, making a part of this specification, in which—

Figure 1:
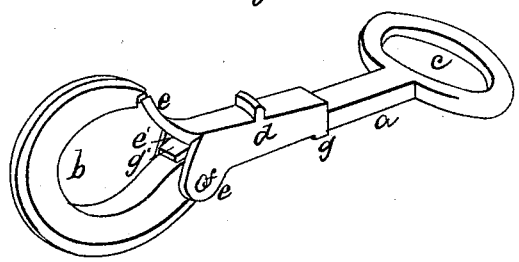
Figure 2:
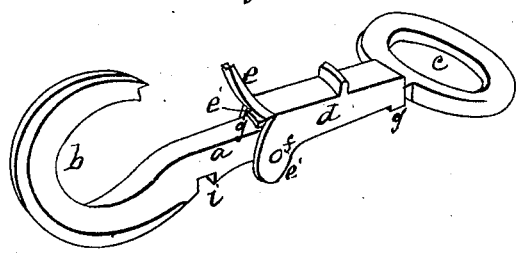
Figure 3:
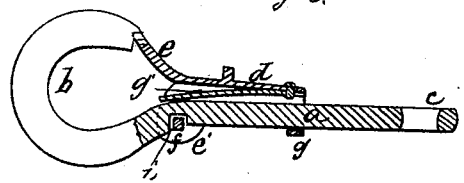

Figure 1 is a perspective view of my improved hook, showing the position of the slide when the hook is closed. Fig. 2 is a perspective view showing the position of the slide when the hook is opened. Fig. 3 is a longitudinal central section through the shank and slide of the hook.

The object of this invention and improvement in snap-hooks for harness and other purposes is to obtain a locking and sliding tongue, which, while it can be readily moved by the hand for opening or closing the hook, is self-locking and will be held by a positive and firm lock in a closed condition.

The nature of my invention consists in a sliding box having a curved tongue on one end and a transverse bar extending across its bottom edges, in combination with a square shanked hook, which is suitably notched to receive the bar and to hold the slide firmly in place when the hook is closed by the tongue, all of which is so constructed and combined that when the sliding tongue is slipped up against the end of the hook a spring will force the transverse bar into the notch in the shank and lock the slide firmly in this position, and when the slide is depressed so as to release the transverse bar from its notch the slide can be slipped back so as to open the hook, as will be hereinafter described.

To enable others skilled in the art to make and use my invention, I will proceed to describe its construction and operation.

It is very desirable that "harness-snaps," as they are called, should be made reliable fastenings, particularly when used about the harness of horses. They should at the same time be made very strong, simple, and cheap; and to this end I form on one end of a square rod, $a$, a flat hook, $b$, and on the other end an oblong eye, $c$, by means of which the hook can be attached to a strap. The shank $a$ of this hook being straight, a three-sided slide, $d$, is applied to it by bending the parts around the shank, as shown in Figs. 1 and 2. This slide consists of a curved projecting piece, $e$, which forms the tongue for closing the hook $b$. Two ears, $e'$ $e'$, which project some distance on one side of the shank for receiving a short transverse bar, $f$, and two lugs, $g$ $g$, which, with the bar $f$, hold the slide on the shank. Between the upper side plate of the slide $d$ and the shank $a$ is interposed a spring, $g'$, the rear end of which is riveted to the slide, and the front end, or that end nearest the hook $b$, bears upon the flat side of the shank, and thus tends to force the front end of the slide outward and the bar $f$ up hard against the opposite surface of the shank. A notch, $i$, is cut across the shank of sufficient size to allow the bar $f$ to slip freely into it when the tongue $e$ is brought up in contact with the end of the hook $b$, as shown in Figs. 1 and 3.

The notch $i$ is made in such a position with relation to the end of hook $b$ and the cross-bar $f$ that when the end of tongue $e$ is brought under the end of the hook $b$ the spring $g'$ will force the bar $f$ into the notch $i$ and the end of tongue $e$ up against the end of the hook, thus closing this end of the hook and locking the tongue firmly in its position.

To move the slide $d$ back, so as to open the hook, it will be necessary to press the front end of the slide down, keeping the hook stationary until the bar $f$ is slipped out of notch $i$, then the slide $d$ can readily be moved back to the position indicated in Fig. 2.

To prevent any lateral thrust or play of the tongue $e$, when it is in place against the hook $b$, a notch is formed in the end of this tongue to receive a corresponding projection which is formed on the end of the hook.

In this way I obtain a very simple, cheap, and strong fastening, which is self-locking, and which is not liable to derangement, and which contains a spring that is so confined as to be out of the way and not liable to be broken.

I am aware that a coiled spring has been used in rear of a slide which forms the snap portion of the hook, to retract such portion and to close the hook after it has been forced open; but this I do not claim.

What I do claim as new, and desire to secure by Letters Patent, is—

1. Combining with the notched shank $a$ and hook $b$ the sliding tongue $e$ and locking-bar $f$, operating substantially as and for the purposes herein described.

2. Inclosing a flat spring, $g'$, which throws the locking-bar $f$ in its place in the notch $i$ within the sliding box $d$, substantially as and for the purposes herein described.

3. In combination with a square notched shank, $a$, the rectangular sliding box $d$, tongue $e$, ears $e'$ $e'$, and locking-bar $f$, substantially as herein described.

4. A sliding spring-tongue, $e$, which is capable of being depressed upon the shank $a$, and also slid longitudinally to unlock and open the snap, substantially as herein described.

Witness my hand in the matter of my application for a patent for an improved snap-hook for harness, &c.

F. PALMER.

Witnesses:
S. A. HUDSON,
E. MILLER.